(12) United States Patent
Schwalbe

(10) Patent No.: US 7,562,892 B2
(45) Date of Patent: Jul. 21, 2009

(54) AIR SUPPORTED TRAILER HITCH

(76) Inventor: Dennis A. Schwalbe, 19603 W. Highway 82, Muenster, TX (US) 76252

( * ) Notice: Subject to any disclaimer, the term of this patent is extended or adjusted under 35 U.S.C. 154(b) by 278 days.

(21) Appl. No.: 11/316,035

(22) Filed: Dec. 22, 2005

(65) Prior Publication Data

US 2006/0163840 A1    Jul. 27, 2006

Related U.S. Application Data

(60) Provisional application No. 60/646,393, filed on Jan. 24, 2005.

(51) Int. Cl.
    *B60D 1/50*      (2006.01)
(52) U.S. Cl. .................. 280/439; 280/441.1; 280/416.1
(58) Field of Classification Search ................ 280/433, 280/438.1, 439, 441.1, 416.1
See application file for complete search history.

(56) References Cited

U.S. PATENT DOCUMENTS

| | | | | |
|---|---|---|---|---|
| 3,380,758 | A * | 4/1968 | Granning | 280/425.1 |
| 4,580,806 | A * | 4/1986 | Kolstad et al. | 280/407 |
| 5,328,198 | A * | 7/1994 | Adams | 280/439 |
| 5,639,106 | A * | 6/1997 | Vitale et al. | 280/407 |
| 5,785,341 | A * | 7/1998 | Fenton | 280/441 |
| 6,135,483 | A * | 10/2000 | Metz | 280/439 |
| 6,170,849 | B1 * | 1/2001 | McCall | 280/433 |
| 6,581,951 | B2 * | 6/2003 | Lange | 280/440 |
| 6,746,037 | B1 * | 6/2004 | Kaplenski et al. | 280/484 |
| 7,377,536 | B2 * | 5/2008 | Rehme | 280/483 |
| 7,380,810 | B1 * | 6/2008 | Wilkens et al. | 280/439 |

* cited by examiner

*Primary Examiner*—Kevin Hurley
(74) *Attorney, Agent, or Firm*—Bracewell & Giuliani LLP

(57) ABSTRACT

A trailer connection assembly connects a trailer to the vehicle having a bed. The trailer connection assembly has a base adapted to be placed in the bed of the vehicle. A support assembly is secured on the base for relative movement so that a distance between the support assembly and the base varies as the support assembly rotates relative to the support frame. The trailer connection assembly includes a trailer connector located on the support assembly. The trailer connection assembly also includes a suspension assembly positioned between the support assembly and the base. The suspension assembly dampens the movement of support assembly relative to the base.

15 Claims, 4 Drawing Sheets

AIR SUPPORTED TRAILER HITCH

RELATED APPLICATIONS

This nonprovisional patent application claims the benefit of provisional patent application U.S. Ser. No. 60/646,393, filed on Jan. 24, 2005, which is hereby incorporated by reference in its entirety.

BACKGROUND OF THE INVENTION

1. Field of the Invention

The present invention relates generally to trailer hitches, and more specifically to a trailer hitch or connector assembly for trailers connecting above a bumper of a vehicle.

2. Background of the Invention

Various connector assemblies are used for connecting a trailer to a vehicle. Often times these assemblies include a "trailer hitch" having a ball joint mounted to the vehicle. A hitch attached to the trailer fits over the ball joint so that the trailer is connected in manner that allows the trailer to be towed while still maintaining maneuverability. The ball joint is typically located on a bumper of the vehicle, but it could also be positioned in a bed of the vehicle if desired. Another assembly includes a u-shaped connector that receives an end portion of a goose-neck trailer. Often, the u-shaped assembly is located in the bed of the vehicle, and the goose-neck extends over the rear bumper and a portion of the bed to connect with the u-shaped connector.

In both assemblies, the ball joint and the u-shaped connector are rigidly mounted to the vehicle. The rigid mounting of these assemblies meant that all forces associated with towing a trailer are translated between the trailer and the vehicle without any shock absorbance or dampening. Impact loads can occur upon when the vehicle accelerates and starts to pull the trailer from a dead stop, and when the vehicle decelerates quickly upon applying brakes after the vehicle and trailer are moving. Impact loads can also occur due to bumps and holes in the road. None of the prior assemblies accommodated the impact loads and forces associated with acceleration, deceleration, and road conditions.

SUMMARY OF THE INVENTION

A trailer connection assembly connects a trailer to the vehicle having a bed. The trailer connection assembly has a base adapted to be placed in the bed of the vehicle. A support assembly is secured on the base for relative movement so that a distance between the support assembly and the base varies as the support assembly rotates relative to the support frame. The trailer connection assembly includes a trailer connector located on the support assembly. The trailer connection assembly also includes a suspension assembly positioned between the support assembly and the base. The suspension assembly dampens the movement of support assembly relative to the base.

The base of the trailer connection assembly can include a support frame extending therefrom. The support assembly is secured to the support frame. The suspension assembly can include a pneumatic billow. The suspension assembly can include a hydraulic shock absorber. The suspension assembly can also include both a pneumatic billow and a hydraulic shock absorber.

The trailer connector can include a ball joint. The trailer connector can include a u-shaped connector. The trailer connector can also include both a ball joint and a u-shaped connector.

A trailer connection assembly connects a trailer to the vehicle having a bed includes a base adapted to be placed in the bed of the vehicle and a support frame extending from the base. A support assembly pivotally connects to the support frame so that the support assembly pivots relative to the frame assembly. A trailer connector is located on the support assembly for movement therewith, and a suspension assembly is positioned between the support assembly and the base. The suspension assembly dampens the movement of support assembly relative to the base.

The suspension assembly of the trailer connection assembly can include a pneumatic billow. A hose can extend between the pneumatic billow and an air supply for pressurizing the pneumatic billow. The suspension assembly of the trailer connection assembly can include a hydraulic shock absorber extending at an angle from the base. The shock absorber can be angled so that the shock absorber extends away from the support frame. The suspension assembly of the trailer connection assembly can include both a hydraulic shock absorber and a pneumatic billow.

A lower end of the suspension assembly can connect to the base, and an upper end can connect to the support assembly. The trailer connector can include a ball joint and a u-shaped connector. The u-shaped connector can be mounted on a pivoting plate for selectively accessing the ball joint.

The support frame of the trailer connection assembly can include a plurality of support members extending from the base and a crossbar extending between the support members. The support assembly is pivotally connected to the crossbar. Each of the plurality of support members can be a metal plate, and the metal plate can be orthogonally mounted to the base.

A method of supporting a connection between a trailer and a truck includes the step of providing a trailer connection assembly with a support assembly pivotally secured to a base, and a suspension assembly positioned between the support assembly and the base. The method also includes the step of placing the trailer connection assembly in the bed of the vehicle. A trailer is then connected to a trailer connector on the trailer connection assembly. Movement of the support assembly relative to the base is then dampened with the suspension assembly.

DETAILED DESCRIPTION OF THE PREFERRED EMBODIMENT

Figure 1:
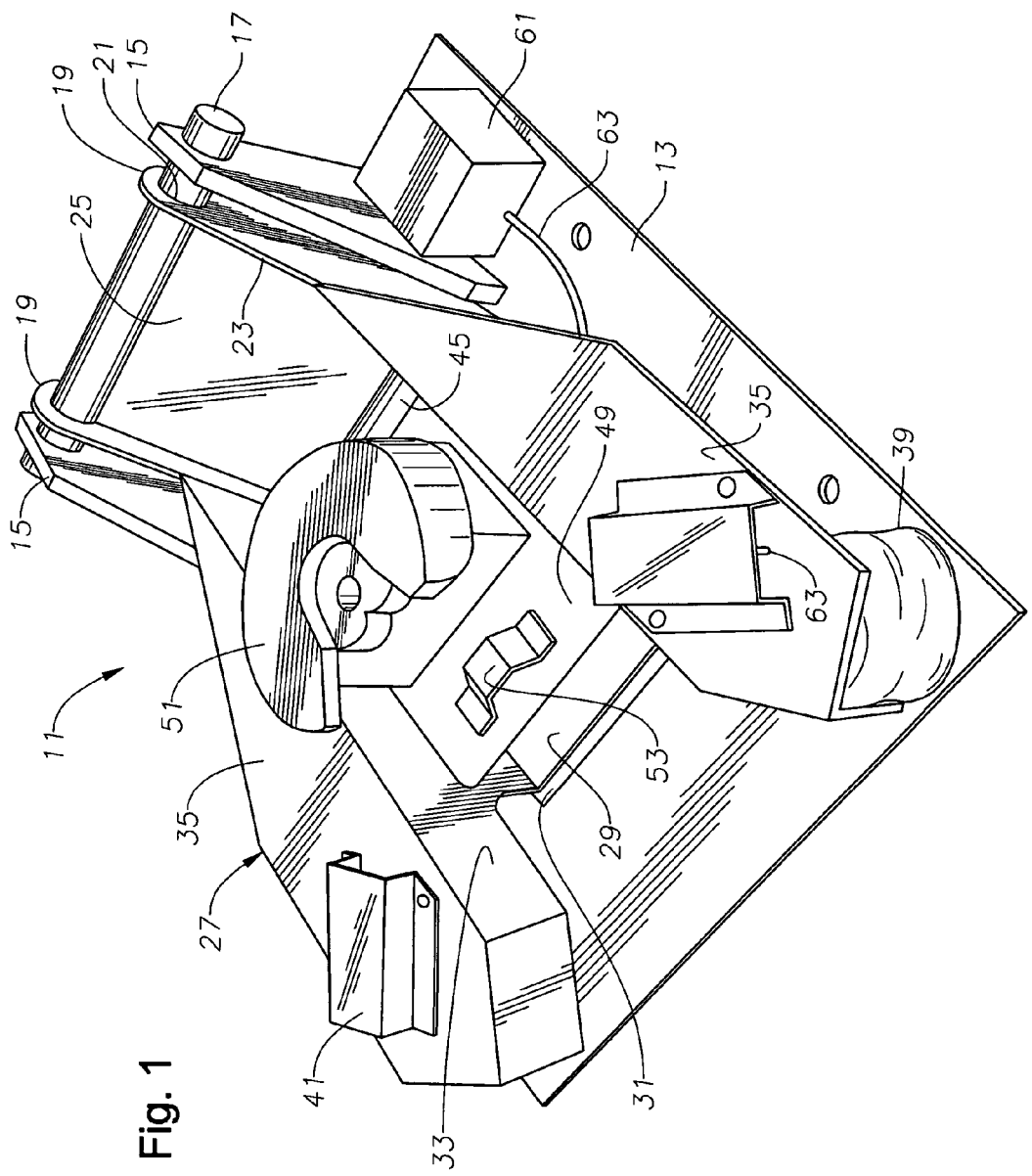
FIG. 1 is a perspective view of a trailer connector assembly, which is constructed in accordance with the present invention, and having a receptor in a lowered position.

FIG. 1 shows a trailer hitching or connector assembly 11 for use on the flatbed of a truck or in the bed of a pickup truck. Connector assembly 11 preferably includes a base plate 13. Base plate 13 as illustrated in FIG. 1 is preferably a sheet of metal having dimensions such that it can fit on the flatbed of a truck or inside of a bed of a pickup truck. As will be readily appreciated by those skilled in the art, base plate 13 can have many variations for the width of base plate 13, and base plate 13 can also be part of a base platform or block. In the preferred embodiment, base plate 13 includes a trailer end and a truck end. The trailer end is situated closer to where the trailer would be positioned relative to trailer assembly 11, while the truck end of base plate 13 would be situated closer to the cab of the truck or pickup onto which trailer assembly 11 is designed to attach.

A support frame, such as a pair of vertical support plates 15 extends substantially vertically upward from base plate 13. In the preferred embodiment, vertical support plates 15 extend substantially perpendicular to base plate 13 from the truck end of base plate 13 so that vertical support plates 15 are situated away from the trailer end of base plate 13.

Crossbar 17 preferably extends between vertical support plates 15, through a distal portion of vertical support plates 15. A pair of vertical mounting plates 19 are preferably connected to crossbar 17 and positioned between vertical support plates 15. Each vertical mounting plate 19 preferably includes an opening 21 through which crossbar 17 extends. Vertical mounting plate 19 is preferably rotatably mounted with crossbar 17 relative to vertical support plates 15.

As will be readily appreciated by those skilled in the art, vertical mounting plate 19 can be rotatably mounted relative to vertical support plates 15 in numerous ways. For example, vertical mounting plate 19 and opening 21 can be sealed to crossbar 17, such that crossbar 17 and vertical mounting plate 19 rotate as a single unit relative to vertical support plates 15. Alternatively, vertical mounting plate 19 and opening 21 can slidingly engage crossbar 17, with crossbar 17 being stationarily connected to vertical support plate 15. Vertical mounting plate 19 and opening 21 would rotatably pivot around crossbar 17.

Preferably, vertical mounting plates 19 include an inclined edge 23 extending angularly downward from crossbar 17 and opening 21. An inclined surface 25 preferably extends between each inclined edge 23 of each of the pair of vertical mounting plates 19. In the preferred embodiment, inclined surface 25 preferably comprises a relatively flat piece of sheet metal extending between vertical mounting plates 19 along substantially the same angle as inclined edges 23 of each vertical mounting plate 19.

Trailer connector assembly 11 preferably also includes a horizontal support assembly 27 cantilevered from inclined edges 23 of vertical mounting plates 19. Horizontal support assembly 27 preferably includes a center plate 29 extending away from the lower portion of inclined surface 25. Center plate 29 preferably extends away from inclined surface 25 in a direction substantially parallel to base plate 13 when horizontal support assembly 27 is not in use. In the preferred embodiment, base plate 13 preferably includes an orifice 31 centrally located within base plate 13. Orifice 31 preferably receives center plate 29 of horizontal support assembly 27, such that center plate 29 is at substantially the same elevation as base plate 13 as horizontal support assembly 27 rotates relative to vertical support plates 15 through vertical mounting plates 19 and crossbar 17.

Center plate 29 can also rotate to an elevation above base plate 13 as horizontal support assembly 27 rotates relative to vertical support plate 15 through crossbar 17 and vertical mounting plates 19. Horizontal support assembly 27 preferably includes a pair of side supports 33 connected to and extending generally upward from center plate 29. In the preferred embodiment, side supports 33 matingly engage and are connected to inclined edges 23 of vertical mounting plates 19. The combination of center plate 29 and side supports 33 preferably defines a substantially U-shaped extension from inclined surface 25.

A horizontal wing 35 is connected to each side support 33, and extends in a direction away from center plate 29. Horizontal wings are preferably substantially parallel to center plate 29.

Figure 2:
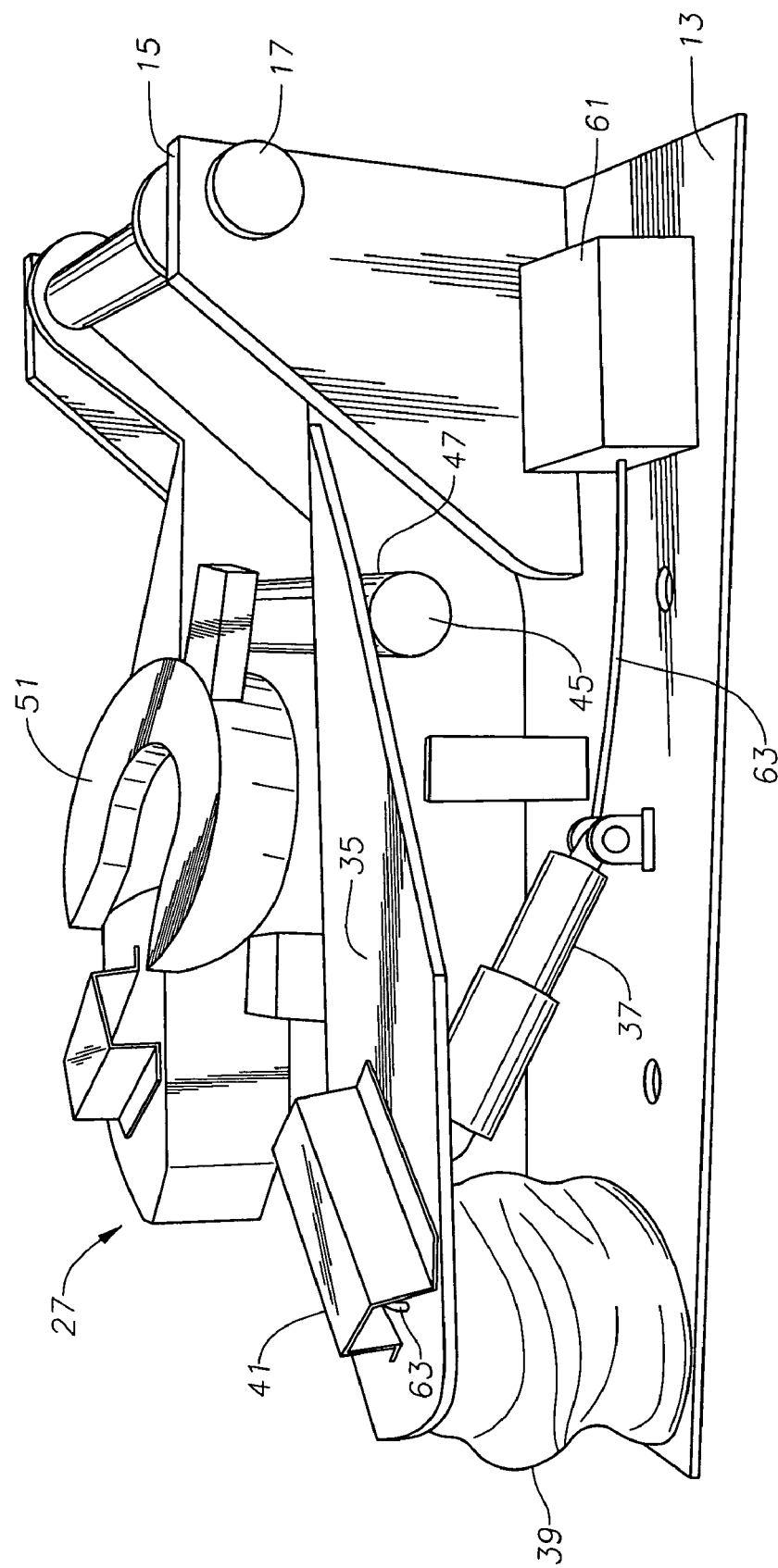
FIG. 2 is a side view of the trailer connector assembly shown in FIG. 1 while the connector is in its lowered position.

Referring to FIG. 2, trailer connector assembly 11 preferably includes a suspension assembly between the horizontal support assembly 27 and the base assembly 13. The suspension assembly can include a support 37, a billow chamber 39, or both. Each support 37 preferably comprises a hydraulic or pneumatic piston rotatably mounted to base plate 13 and each horizontal wing 35. Support 37 advantageously provides resistance to axial movement of horizontal support assembly 27 relative to base plate 13 as horizontal support assembly 27 rotates about crossbar 17 and vertical support plate 15. In practice, support 37 advantageously provides a dampening effect and acts like a shock absorber to any up and down movement from the connection between a trailer and trailer connector assembly 11.

Trailer connector assembly 11 also preferably includes a billow chamber 39 located between each horizontal wing 35 and base plate 13. Billow chamber 39 also provides support for horizontal support assembly 27 responsive to downward movement of horizontal support assembly 27 relative to base plate 13. Billow chamber 39 is preferably filled with air by air hoses 63 from a pressurized air source 61. In the preferred embodiment, each billow chamber 39 is preferably positioned toward the trailer end of base plate 13 a predetermined distance away from vertical support plates 15. In the preferred embodiment, a hose cover 41 is preferably connected to an upper surface of each horizontal wing 35. Hose cover 41 advantageously provides a physical barrier that acts to protect the air hoses (not shown) extending from an air supply (not shown) to each billow chamber 39.

Figure 3:
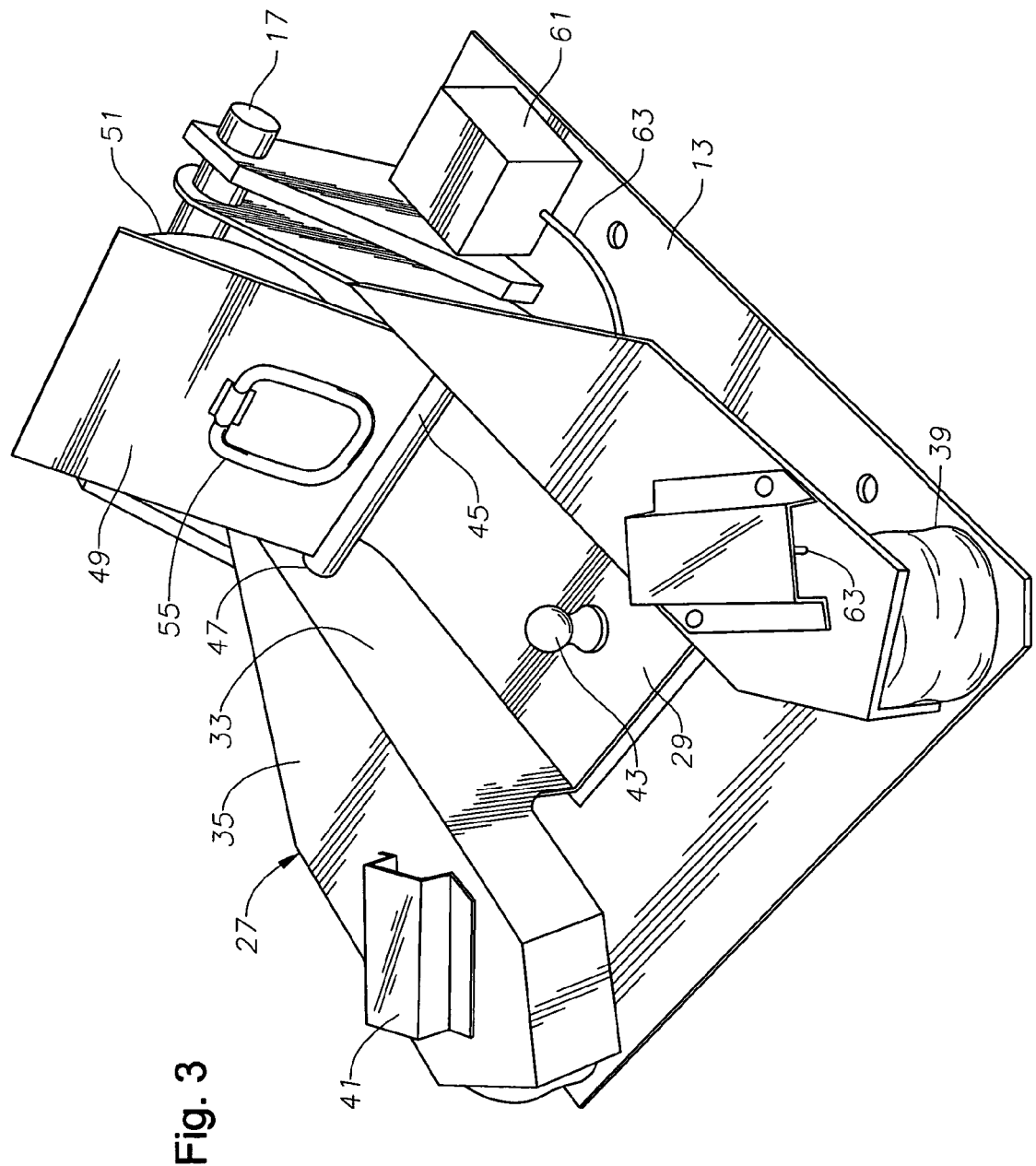
FIG. 3 is a perspective view of the trailer connector assembly shown in FIG. 1 with the receptor in a raised position.

As shown in FIG. 3, horizontal support assembly 27 preferably includes a ball joint 43 extending axially upward from center plate 29. As will be readily appreciated by those skilled in the art, ball joint 43 is capable of being used for connecting to or hitching various trailers throughout the industry.

Referring back to FIGS. 1 and 2, a crossbar 45 is preferably positioned above central plate 29 of horizontal support assembly 27. Crossbar 45 preferably extends between a pair of openings 47 extending through each side support 33 of horizontal support assembly 27. Mounting plate 49 preferably connects to crossbar 45 and is supported by ball joint 43 (FIG. 3). Mounting plate 49 is rotatable about crossbar 45 relative to horizontal support assembly 27 between a lowered positioned shown in FIGS. 1 and 2, and a raised position shown in FIG. 3.

In the preferred embodiment, a receptor 51 is attached to an upper surface of mounting plate 49. Receptor 51 is preferably a standard receptor for hitching or connecting a gooseneck trailer to a pickup or flatbed truck. Receptor 51 preferably includes a U-shaped portion for guiding and receiving the connector portion of a gooseneck trailer, and a pair of locking dogs for maintaining the connection with a gooseneck trailer.

A tool receiver 53 is preferably also mounted on mounting plate 49. Tool receiver 53 preferably has a tubular cross-section and is mounted to the upper surface 49 for insertion of a tool to help move mounting plate 49 and receptor 51 about crossbar 45, between the raised and lowered positions of mounting plate 49. In the preferred embodiment, mounting plate 49 and receptor 51 are in the lowered position of mounting plate 49 (FIGS. 1 and 2) when trailer connector assembly 11 is used for connection with a gooseneck trailer. Conversely, mounting plate 49 and receptor 51 are in the raised position of mounting plate 49 (FIG. 3) when trailer connector assembly 11 is used for connection with a trailer having receptor for a ball joint such as ball joint 43 connected to center plate 29.

Referring to FIG. 3, a U-bolt 55 is preferably connected to the lower surface of mounting plate 49. U-bolt 55 is helpful when pulling on mounting plate 49 to move mounting plate 49 from its raised position to its lowered position. U-bolt 55 also advantageously connects with ball joint 43 when mounting plate 49 is in its lowered position (FIGS. 1 and 2).

In operation, when connector assembly 11 is mounted to the bed of a pickup or a flatbed of a truck, and a trailer is connected to either receptor 51 while mounting plate 49 is in its lowered position or ball joint 43 while mounting plate 49 is in its raised position, connector assembly 11 advantageously provides a dampening effect for sudden axial movements between the truck and the trailer being towed by the truck. Any upward forces experienced by horizontal support assembly 27 from a trailer connected to trailer connector assembly 11 are translated through supports 37 in billow chambers 39. Supports 37 advantageously dampen any axially upward forces from the trailer, while both supports 37 and billow chambers 39 advantageously dampen or absorb shocks from any downward forces experienced by horizontal support assembly 27 connected to trailer assembly 11. The air supply preferably refills billow chamber 39 when necessary to obtain a desired air pressure within each billow chamber 39 during operation.

Figure 4:
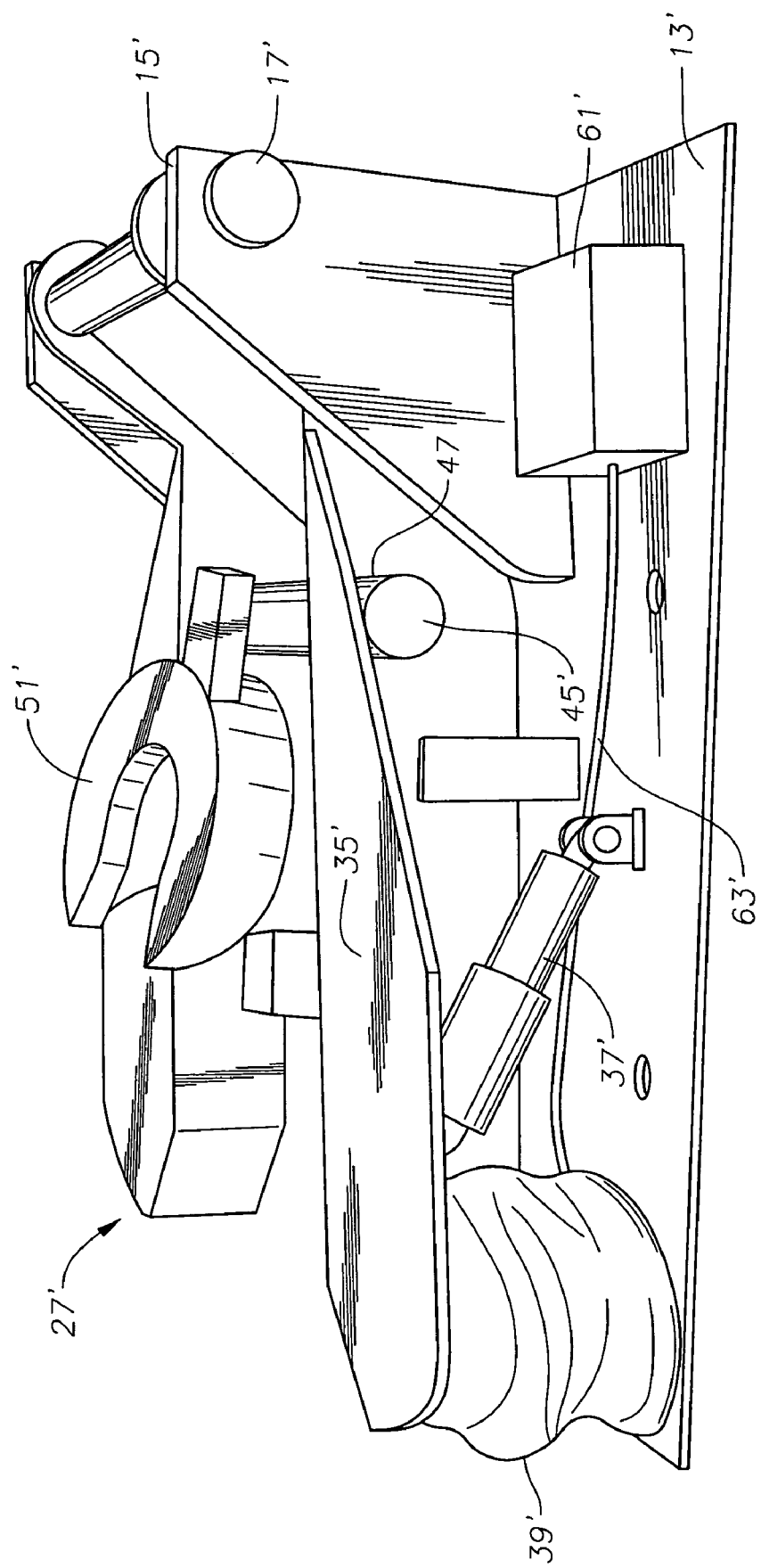
FIG. 4 is a side view of trailer connector assembly having a receptor in a lowered position, which is constructed in accordance with an alternative embodiment of the present invention.

An alternative embodiment of connector assembly 11 is shown in FIG. 4. In the alternative embodiment, hoses 63' extend from air source 61' toward billow chamber 39'. Hoses 63' connects to billow chamber 39' below horizontal wing 35', instead of extending above horizontal wing 35 as in the embodiment shown in FIGS. 1-3. In the alternative embodiment shown in FIG. 4, there is no need for hose covers 41 because hoses 63' remain below horizontal wing 35'.

While the invention has been shown in only one of its forms, it should be apparent to those skilled in the art that it is not so limited, but is susceptible to various changes without departing from the scope of the invention. For example, base plate 13 can be replaced with a bed of a truck, so that vertical support plates 15 are connected directly to the bed of a vehicle. Moreover, vertical mounting plates 19 and mounting plate 49 could connect to a tubular member that rotates around their respective crossbars 17, 45. Air source could also be located away from base 13 such as by an air compressor positioned adjacent connector assembly 11 in the bed of the vehicle.

That claimed is:

1. A trailer connection assembly that connects a trailer to a vehicle having a bed, comprising:
   a base plate adapted to be placed in the bed of the vehicle;
   a support frame secured to and extending upward from the base plate;
   a horizontal support assembly having a forward end pivotally connected to an upper end of the support frame, defining a pivot point for relative movement so that a distance between a rearward portion of the horizontal support assembly and the base plate varies as the horizontal support assembly rotates about the pivot point;
   a trailer connector located on the horizontal support assembly;
   wherein the trailer connector is located closer to the base plate than the pivot point; and
   a suspension assembly positioned between the horizontal support assembly and the base plate, rearward of the pivot point, that dampens the movement of horizontal support assembly relative to the base plate.

2. The trailer connection assembly of claim 1, wherein the suspension assembly comprises a billow chamber.

3. The trailer connection assembly of claim 1, wherein the suspension assembly comprises a hydraulic shock absorber.

4. The trailer connection assembly of claim 1, wherein the trailer connector comprises a ball joint.

5. The trailer connection assembly of claim 1, wherein the trailer connector comprises a u-shaped connector.

6. The trailer connection assembly of claim 1, wherein a lower end of the suspension assembly connects to the base plate.

7. The trailer connection assembly of claim 1, wherein an upper end of the suspension assembly connects to the horizontal support assembly.

8. The trailer connection assembly of claim 2 further comprising a hose extending between the billow chamber and an air supply for pressurizing the billow chamber.

9. The trailer connection assembly of claim 3 wherein the hydraulic shock absorber extends at an angle from the base plate.

10. The trailer connection assembly of claim 1 wherein the suspension assembly further comprises a shock absorber, the shock absorber having a lower end mounted to the base plate and an upper end mounted to the horizontal support assembly, the upper end being located more rearward than the lower end.

11. The trailer connection assembly of claim 1 wherein the suspension assembly comprises a hydraulic shock absorber and a billow chamber, wherein the billow chamber is located rearward of the shock absorber.

12. The trailer connection assembly of claim 1, wherein the support frame further comprises a pair of upward extending support plates extending from the base plate and a crossbar extending between the support plates, the forward end of the horizontal support assembly being pivotally connected to the crossbar.

13. The trailer connection assembly of claim 12, wherein each of the pair of support plates comprise a metal plate.

14. The trailer connection assembly of claim 13, wherein each metal plate is orthogonally mounted to the base plate.

15. A trailer connection assembly that connects a trailer to a vehicle having a bed, comprising:
   a base plate adapted to be placed in the bed of the vehicle;
   a support frame extending upward from the base plate;
   a horizontal support assembly having a forward end pivotally connected to the support frame so that the horizontal support assembly pivots relative to the support frame;
   a trailer connector located on the horizontal support assembly for movement therewith;
   a suspension assembly positioned between the horizontal support assembly and the base plate that dampens the movement of horizontal support assembly relative to the base plate, and
   wherein the trailer connector comprises:
   a ball joint and a u-shaped connector, the u-shaped connector being mounted on a mounting plate for selectively accessing the ball joint, wherein the mounting plate is pivotally mounted on the horizontal support assembly and is rotatable between a first position overlying the ball joint and a second position exposing the ball joint.

* * * * *